United States Patent [19]

Hagenbach et al.

[11] Patent Number: 4,567,222

[45] Date of Patent: Jan. 28, 1986

[54] PROCESS FOR PREPARING BITUMEN-POLYMER COMPOSITIONS, APPLICATION TO THESE COMPOSITIONS OF THE OBTENTION OF COVERINGS AND MOTHER SOLUTION OF POLYMER USABLE FOR THE OBTENTION OF THE SAID COMPOSITIONS

[75] Inventors: Germain Hagenbach, Vernaison; Paul Maldonado, St Symphorien d'Ozon; Jacques Maurice, Pau, all of France

[73] Assignee: Elf France, Paris, France

[21] Appl. No.: 703,916

[22] Filed: Feb. 21, 1985

Related U.S. Application Data

[62] Division of Ser. No. 502,827, Jun. 9, 1983, Pat. No. 4,554,313.

[30] Foreign Application Priority Data

Jun. 10, 1982 [FR] France .............................. 82 10095

[51] Int. Cl.$^4$ ................................................ C08K 5/01
[52] U.S. Cl. ..................................... 524/476; 524/481; 524/484; 524/486; 404/17; 404/32; 525/54.5
[58] Field of Search ............... 524/476, 481, 484, 486; 404/17, 32; 525/54.5

[56] References Cited

U.S. PATENT DOCUMENTS

| | | | |
|---|---|---|---|
| 3,541,032 | 11/1970 | Pampus et al. ..................... | 524/484 |
| 3,676,166 | 7/1972 | Louthan .............................. | 524/486 |
| 4,001,167 | 1/1977 | Tungseth et al. ................... | 524/476 |

*Primary Examiner*—Melvyn I. Marquis
*Attorney, Agent, or Firm*—Burgess, Ryan & Wayne

[57] ABSTRACT

Bitumen-polymer compositions are prepared, by mixing, at between 130° C. and 230° C., a bitumen with a styrene and conjugated diene copolymer and a sulphur source, the copolymer and the sulphur source being added to the bitumen either directly, or in the form of a mother solution in a hydrocarbon oil, then by maintaining the whole under stirring at between 130° C. and 230° C. for at least fifteen minutes.

By way of sulphur source is used 0.005 to 15% by weight, with respect to bitumen, one or several polymeric or not, cyclic or linear polysulphides, and especially ditertiododecyl or dinonyl pentasulphide. The bitumen-polymer compositions obtained can be used for the obtention of superficial road coverings and present a constant quality of its properties.

22 Claims, No Drawings

PROCESS FOR PREPARING BITUMEN-POLYMER COMPOSITIONS, APPLICATION TO THESE COMPOSITIONS OF THE OBTENTION OF COVERINGS AND MOTHER SOLUTION OF POLYMER USABLE FOR THE OBTENTION OF THE SAID COMPOSITIONS

This is a division of application Ser. No. 502,827 filed June 9, 1983, now U.S. Pat. No. 4,554,313.

The present invention concerns a process for the preparation of bitumen-polymer compositions. It also concerns the application of compositions obtained through this process to the production of coatings, and in particular superficial road coverings, and relates, furthermore, to a polymer mother solution for the obtention of said compositions.

It is known to use bituminous compositions as coverings for diverse surfaces and, especially, as superficial road coverings.

It is also known that various polymers can be added to the bitumens in order to form bitumen-polymer type compositions, that present improved mechanical properties with respect to the polymer-free bituminous compositions. Examples of polymers suitable for the adding to the bitumens are, for instance, polyisoprene, butyl rubber, polyisobutene, ethylene and vinyl acetate copolymers, polymethacrylate, polychloroprene, random or block copolymers of styrene and a conjugated diene. Among these latter random or block copolymers of styrene and a conjugated diene and especially styrene and butadiene or styrene and isoprene, are known as being particularly efficient, since they dissolve very easily in bitumens and confer on the said bitumens very good mechanical properties and particularly excellent visco-elasticity properties. Furthermore, it is known to increase the stability of the bitumen-polymer compositions, and thus to widen their field of application, by realizing a chemical coupling between the polymer and the bitumen.

This can be carried out, for example, as described in French Pat. No. 76.39233 (published under No. 2.376.188) filed Dec. 28, 1976, by mixing, at a temperature comprised between 130° C. and 230° C., bitumen with, by weight of bitumen, 2 to 25% of a styrene and conjugated diene random or block copolymer and 0.1 to 3% chemically non-linked sulfur, and by maintaining the resulting mixture at the temperature mentioned herein-above and under stirring for at least twenty minutes.

In such a process, which involves a direct solubilisation of the polymer in the bitumen, a suitable homogeneity is only achieved after a period of stirring of the mixture of bitumen, polymer and sulphur at high temperatures, comprised between 130° C. and 230° C. and most often at about 150° C. to 200° C. which increases progressively with the quantity of polymer to be incorporated into the bitumen and needs, in the majority of cases, about 2 to 4 hours.

This relatively long homogeneisation period and the consequent substantial calorific energy consumption, reflect unfavorably on the cost price of the operation. Furthermore, the compositions obtained through this process, although having acquired useful mechanical properties, possess high viscosities, that make them difficult to spread using standard distributors equipping the spreading material.

In order to facilitate the preparation of bitumen-polymer compositions, for which a styrene and conjugated diene random or block copolymer is linked to the bitumen by using chemically non-linked sulphur as the coupling agent, and to render the said compositions directly utilisable by classic spreading means, it has been proposed, as described in French Pat. No. 78.18534 (published under No. 2.429.241) filed June 21, 1978 to simultaneously incorporate into the bitumen the copolymer and the sulphur in the form of a mother solution of these two products in a solvent constituted by a hydrocarbon oil having a distillation range at atmospheric pressure comprised between 150° C. and 250° C., the said mother solution being prepared at a temperature comprised between 80° C. and 160° C. and being added to the bitumen at temperatures between about 130° C. and 230° C.

The dissolution of the copolymer in the hydrocarbon fraction is quicker and easier than the direct dissolution of the said copolymer in the bitumen, and there is a consequent saving of time and energy to obtain the final bitumen-polymer composition. Furthermore a fluidified composition is obtained directly that satisfies the viscosity requirements necessary for the obtention of good spreading conditions.

In the process described in French Pat. No. 76.39233, as in the improved process of French Pat. No. 78.18534, the use of chemically nonlinked sulphur, especially sulphur flower or alpha crystallized sulfur, as coupling agent of the copolymer to the bitumen presents certain drawbacks.

Indeed, at the moment of direct incorporation of the copolymer and the sulphur into the bitumen, it is difficult to distribute the sulphur throughout the mixture in a homogenous manner, and in the same way, to accordingly carry out regularly the chemical grafting of the copolymer to the bitumen and cross-linking the chains of the copolymers between one another. Furthermore, when the copolymer and the sulphur are incorporated into the bitumen using the mother solution technique, local over-vulcanisations of the polymer can occur, during the preparation of the mother solution, which subsequently unfavorably influence the properties of the final bitumen-polymer composition. Furthermore, in this mother solution, the sulphur can recrystallize and form sediment with time, especially after prolonged storage at ambient temperature, which thus renders difficult the obtention of a product of constant quality.

It has now been found that it is possible to eliminate the drawbacks inherent in the use of solid sulphur in preparation techniques of bitumen-polymer compositions of the same type as those proposed in the above-mentioned French patents, by replacing the said sulphur by a polysulphide, and especially by a dihydrocarbyl polysulphide.

Such a polysulphide is more easily soluble in the bitumen or in the hydrocarbon oil fraction constituting the solvent of the mother solution that the finely divided solid sulphur, and furthermore, the quantity of radicular sulphur that forms from polysulphide, is easier to control than that produced from solid sulphur, which allows a better control of grafting the copolymer to the bitumen and the cross-linking of the copolymers between one another, with, as a result, the obtention of a bitumen-polymer composition presenting a constant quality in its properties. This constitutes an important advantage during repair works of road coverings, which necessitate quantities of bitumen-polymer composition of several thousand tons to be prepared in several fractions.

The invention thus concerns a process for the preparation of bitumen-polymer compositions, in which is produced, at a temperature comprised between 130° C. and 230° C., a mixture of bitumen with a styrene and conjugated diene copolymer, used in a quantity ranging from 0.5 to 15% by weight bitumen, and a sulphur source, and the mixture thus obtained, is maintained under stirring, within the said temperature range, during a period of at least 15 minutes, the said process being characterized in that, as sulphur source, is used 0.005 to 15% by weight, with respect to the bitumen, of a polysulphide or a polysulphides mixture having the general formula:

$$R_1-(S)_m-R-(S)_m)_x R_2$$

in which:

$R_1$ and $R_2$ each designate a $C_1$ to $C_{20}$ saturated or unsaturated monovalent hydrocarbon radical or are linked together in order to constitute a $C_1$ to $C_{20}$ saturated or unsaturated divalent hydrocarbon radical forming a cycle with the other groups of atoms associated in the formula;

R is a $C_1$ to $C_{20}$ saturated or unsaturated, divalent hydrocarbon radical;

$-(S)_m-$ represents divalent groups each formed from "m" sulphur atoms, "m" able to be different from one of the said groups to the other and designating whole numbers ranging from 1 to 6 with at least one of m being equal to or above 2; and x represents a whole number ranging from 0 and 10.

In the formula shown above, the $C_1$ to $C_{20}$ monovalent hydrocarbon radicals, $R_1$ and $R_2$ as well as the $C_1$ to $C_{20}$ divalent hydrocarbon radical, are especially selected from among the aliphatic, alicyclic or aromatic radicals. When the $R_1$ and $R_2$ radicals are connected to one another to constitute a $C_1$ to $C_{20}$ divalent hydrocarbon radical forming a cycle with the other groups of atoms associated in the formula, the said divalent radical is similar to radical R and can also be of the aliphatic, alicyclic, or aromatic type. In particular, radicals $R_1$ and $R_2$ are identical and selected from among $C_1$ to $C_{20}$ alkyl radicals, for example, ethyl, propyl, hexyl, octyl, nonyl, decyl, linear dodecyl, tertiododecyl, hexadecyl, octadecyl, and $C_6$ to $C_{20}$ cycloalkyl and aryl radicals, especially benzyl, phenyl, tolyl, cyclohexyl, whereas radical R or the divalent radical formed by the association of $R_1$ and $R_2$ are selected among the $C_1$ to $C_{20}$ alkylene radicals, or $C_6$ to $C_{20}$ cycloalkylene or arylene radicals such as phenylene, tolylene and cyclohexylene.

Polysulphides for use according to the present invention are, in particular, those defined by the formula:

$$R_1-(S)_n-R_2$$

in which:

$R_1$ and $R_2$ each designate a $C_1$ to $C_{20}$ saturated or unsaturated monovalent hydrocarbon radical, or are joined together in order to form a $C_1$ to $C_{20}$ divalent radical similar to R, $R_1$, $R_2$ and R having the previously indicated meaning;

$-(S)_n-$ represents a divalent group formed by a chaining of n sulphur atoms;

n being an integer ranging from 2 to 6.

Preferred polysulphides have the general formula:

$$R_3-(S)_p-R_3$$

in which:

$R_3$ designates a $C_6$ to $C_{16}$ alkyl radical; and, $-(S)_p-$ represents a divalent grouping formed by the chaining of p sulphur atoms;

p being an integer ranging from 2 to 5.

Examples of such polysulphides are especially dihexyl disulphide, dioctyl disulphide, dihexadecyl disulphide, dihexyl trisulphide, dioctyl trisulphide, dinonyl trisulphide, ditertiododecyl trisulphide, dihexadecyl trisulphide, dioctyl tetrasulphide, dinonyl tetrasulphide, ditertiododecyl tetrasulphide, dihexadecyl tetrasulphide, dihexyl pentasulphide, dioctyl pentasulphide, dinonyl pentasulphide, ditertiododecyl pentasulphide, dihexadecyl pentasulphide, dioctyl disulphide, didodecyl disulphide, dihexyl tretrasulphide.

Other polysulphides, that can be used according to the invention, are, for example, diphenyl trisulphide, dibenzyl trisulphide, diphenyl tetrasulphide, orthotolyl tetrasulphide, dibenzyl tetrasulphide, dibenzyl pentasulphide, diallyle pentasulphide, tetramethyltetrathiane.

The quantity of polysulphide, that can range from 0.005% to 15% by weight of bitumen, preferably represents 0.1% to 5% by weight.

The bitumen, that constitutes the major part of the bitumen-polymer compositions according to the invention, is selected from among the various bitumens having a penetration, defined according to French standard NFT 66004, comprised between 5 and 500 and preferably 20 and 400. Such bitumens can be, in particular, direct distillation bitumens, or blown or semi-blown bitumens having a penetration comprised within the ranges mentioned herein-above.

The styrene and conjugated diene copolymer, used in the preparation of the bitumen-polymer composition, is advantageously selected from among the following random or block copolymers: styrene and butadiene, styrene and isoprene, styrene and chloroprene, styrene and carboxylated butadiene and styrene and carboxylated isoprene copolymers. The styrene and conjugated diene copolymer, and in particular each of the abovedmentionel copolymers, has a styrene content by weight ranging preferably from 15% to 40%. The average viscosimetric molecular weight of the styrene and conjugated diene copolymer, and especially that of the copolymers mentioned above, may be advantageously comprised between 30.000 and 300.000 and located preferably between 70.000 and 200.000.

The styrene and conjugated diene copolymer is preferably selected from amont the following di- or triblock copolymers: styrene and butadiene, styrene and isoprene, styrene and carboxylated butadiene, styrene and carboxylated isoprene copolymers having a styrene content and molecular weight comprised within the range mentioned herein-above.

The preferred quantity of copolymer added to the bitumen is comprised between 0.7% and 10% by weight of bitumen.

In a preferred embodiment of the invention, the copolymer and the polysulphide are incorporated into the bitumen in the form of a mother solution of these two products in a solvent consisting of a hydrocarbon oil, that presents a distillation range at atmospheric pressure, determined according to U.S. standard ASTM D 88-67, comprised between 100° C. an 450° C. and preferably between 150° C. and 370° C.

This hydrocarbon oil, that can be especially a petroleum cut having an aromatic character, a petroleum cut having a naphteno-paraffinic character, a petroleum cut having a naphteno-aromatic character, a coal oil or an oil of vegetable origin, is sufficiently "heavy" in order to limit the evaporation at the moment of the addition of the mother solution to the bitumen and at the same time sufficiently "light" to be eliminated at maximum after spreading the bitumen-polymer composition containing it in such a way as to recover the same mechanical properties that would have presented, after hot spreading, the bitumen-polymer composition, prepared without using the mother solution technique.

The mother solution is prepared by contacting the ingredients comprising it, namely hydrocarbon oil acting as solvent, copolymer, and polysulphide, under stirring, at temperatures comprised between 20° and 170° C. and more particularly between 40° and 120° C., during sufficient time, for example about 30 minutes to about 90 minutes, in order to obtain a complete dissolution of the copolymer and polysulphide in hydrocarbon oil.

The respective copolymer and polysulphide concentrations in the mother solution can vary fairly widely in function especially of the nature of the hydrocarbon oil used to dissolve the copolymer and polysulphide. Therefore, the respective quantities of copolymer and polysulphide can advantageously represent 5% to 40% and 0.1 to 15% by weight of hydrocarbon oil. A preferred mother solution contains, by weight of hydrocarbon oil used as solvent, 10 to 35% copolymer and 0.5 to 5% polysulphide.

When the compositions according to the invention are directly formed from the bitumen, copolymer and polysulphide, it is preferable to operate by contacting the copolymer with the bitumen in selected proportions, at a temperature comprised between 130° C. and 230° C. and under stirring, during a period, generally from 20 minutes or more to several hours, in order to form a homogenous mixture, then by adding the polysulphide to the mixture obtained and maintaining the whole under stirring at a temperature comprised between 130° C. and 230° C., for example, corresponding to contacting temperature of the copolymer with the bitumen, during a period at least equal to 15 minutes, and generally ranging from 15 to 90 minutes, to allow the polysulphide to liberate the radicular sulphur and to allow the radicular sulphur thus produced to initiate on the one hand the grafting of the copolymer to the bitumen and, on the other hand, the cross-linking between themselves of the chains of the copolymer.

The quantities of the copolymer contacted with the bitumen and polysulphide thereafter added to the homogenous mixture of the bitumen and said copolymer are selected to be comprised within the ranges herein-above specified for these quantities.

To prepare the bitumen-polymer compositions according to the present invention, by using the mother solution technique, the mother solution of the copolymer and the polysulphide is mixed with the bitumen, operating at a temperature comprised between 130° and 230° C. and under stirring, this being carried out, for example, by adding the mother solution to the bitumen maintained under stirring at a temperature between 130° C. and 230° C., then the resulting mixture is maintained under stirring at a temperature comprised between 130° C. and 230° C., for example, at the temperature used for adding the mother solution to the bitumen during a period at least equal to 15 minutes, and generally ranging from 15 to 90 minutes, to allow through the biais of the polysulphide, the grafting of the copolymer to the bitumen asphaltenes and the cross-linking between themselves of the chains of the said copolymer.

The quantity of mother solution mixed to the bitumen is selected to supply the desired quantities, with respect to the bitumen, of this copolymer and polysulphide, the said quantities being in the ranges defined herein-above.

One form of realisation that is especially preferred for the preparation of the bitumen-polymer composition according to the present invention, through use of the mother solution technique consists in contacting, at a temperature comprised between 130° C. and 230° C. and under stirring, from 80 to 95% by weight bitumen with 20 to 5% by weight mother solution, this mother solution containing by weight of the hydrocarbon oil acting as the solvent, 10 to 35% styrene and conjugated diene copolymer and 0.5 to 5% polysulphide, then in maintaining the thus obtained mixture under stirring at a temperature comprised between 130° C. and 230° C., and preferably at the temperature prevailing during contacting the bitumen and the mother solution, for a period of at least 15 minutes, and preferably comprised between 20 and 60 minutes.

The bitumen-polymer compositions obtained through the process according to the invention can be used for producing various coverings, and especially superficial road coverings. For this application, particularly, the bitumen-polymer compositions according to the invention prepared by the mother solution technique are especially adapted, since they can be directly used with standard spreading means.

The invention is illustrated by the following non-limitative examples.

The rheological and mechanical characteristics of the bitumens or bitumen-polymer compositions to which reference is made in these examples are the following:

penetration: expressed in 1/10 mm and measured in accordance with standard NFT 66004.

softening point: expressed in °C. and determined by Ball and Ring test (B & A test defined by standard NFT 66008).

Fraass point: fragility point, expressed in °C. and determined in accordance with standrad IP 80/53.

rheological characteristics by elongation (standard NFT 46002)
threshold strain $\alpha_s$ ... in bars
threshold elongation $\epsilon_s$ ... in %
strain at rupture $\alpha_r$ ... in bars
elongation at rupture $\epsilon_r$ ... in % cinematic viscosity: expressed in stokes and determined according to French standard NFT 60100.

pseudo-viscosity expressed in seconds and determined in accordance with French standard NFT 66005.

EXAMPLE 1

Preparation of a bitumen-polymer composition according to the invention through direct incorporation of the copolymer and the polysulphide to the bitumen.

Operating at 170° C. under stirring, 1,000 parts by weight of a direct distillation bitumen having a penetration of 82, "ball and ring" softening point of 48° C., Fraass point equal to −18.5° C. and a cinematic viscosity at 160° C. of 1.7 stokes, with 31 parts by weight of a di-block styrene and butadiene copolymer having an average viscosimetric molecular weight equal to about 75.000 and containing 25% by weight styrene.

After 3 hours 20 minutes of mixing under stirring, a homogenous mass is obtained.

To this mass maintained at 170° C., 7.3 parts by weight ditertiododecyl pentasulphide are added, and the whole is again stirred for thirty minutes in order to form the composition according to the invention.

Table I shows the principle characteristics of the bitumen-polymer composition thus obtained both before and after having subjected it to the aging test called "Rolling Film Oven Test" defined in ASTMD 2872, modified in order to bring the period of heat treatment to 150 minutes. The compositions according to the invention before and after the aging test are designated respectively by "Product Ia1" and "Product Ia2".

Table I also gives the corresponding characteristics of the starting bitumen before and after the aging test (respectively "Product Ib1" and "Product Ib2").

It is noted from the values indicated on table I that the use of ditertiododecyl pentasulphide, as the sulphur supply, leads to a bitumen-polymer composition, the elastomer characteristics of which differentiate it very clearly from the bitumen (cf. the traction test results). Furthermore, the stability to aging of the bitumen-polymer composition obtained is susbstantially improved with respect to that observed for the pure bitumen.

EXEMPLE 2

Preparation of a bitumen-polymer composition according to the invention through the mother solution technique.

(a) Preparation of the mother solution

Operating occurs in a stainless steel reactor provided with a stirrer and a double jacket adapted to be through-crossed by a heat-carrying fluid.

The hydrocarbon oil used as solvent to form the mother solution was a petroleum cut having a naphteno/aromatic character presenting the following characteristics:
ASTM initial distillation point equal to 176° C.,
ASTM final distillation point equal to 352° C., (measured according to standard ASTM D 86-67).
flash point (French Luchaire standard NFT 60103) of 79° C.,
volumic mass (U.S. standard ASTM D 1657-64) equal to 0.956.

233 parts by weight of the petroleum cut were introduced into the reactor and this petroleum cut was heated, under stirring, to a temperature of about 100° C. through circulation of a hot fluid in the double jacket of the reactor.

While maintaining thus temperature, and under stirring, 13 parts by weight of the pentasulphide used in Example 1 and 54 parts by weight of a powder, containing 2% by weight silica to prevent lumping, of a diblock styrene and butadiene copolymer containing 25% styrene and possessing an average viscosimetric molecular weight of about 75.000 were introduced.

After one hour's stirring at about 100° C., a homogenous and fluid solution at ordinary temperature is obtained characterized by the following cinematic viscosity values:

| | |
|---|---|
| cinematic viscosity measured at 50° C. | 12.10 stokes |
| cinematic viscosity measured at 100° C. | 2.92 stokes |

This solution constituted the mother solution used for the preparation of the bitumen-polymer composition.

(b) Preparation of the bitumen-polymer composition

Into an oven equipped with stirrers and provided with steam reheaters, is pumped at 170° C., 1,700 parts of a direct distillation bitumen having the following initial physical properties:
softening point (B & R test) . . . 48° C.
Fraass point . . . −18.5° C.
penetration . . . 82 1/10 mm
cinematic viscosity at 160° C. . . . 1.70 stokes To the contents of the oven, maintained at 170° C. under stirring, is thereafter added 300 parts of the mother solution prepared as described herein-above.

After 30 minutes stirring at 170° C., a bitumen-polymer fluid composition presenting a dynamic viscosity at 160° C. equal to 0.098 Pa.s., i.e. a viscosity comparable to that of a bitumen having a penetration within the range 180–220, and able to be charged directly in a standard medium pressure spreading distributor. Table II shows the properties of the bitumen-polymer composition thus obtained before and after having subjected it to thermal treatment consisting in bringing to 50° C. a film of 1 mm thickness of the bitumen-polymer composition and maintaining the said film at this temperature for 15 days, this test allowing the simulation of the evolution of the product during one year on the road. The bitumen-polymer is designated by "Product IIa1" before thermal treatment and by "Product IIa2" after thermal treatment. Table II also shows, by way of comparison, before and after the herein-above mentioned thermal treatment, the corresponding characteristics of the starting bitumen fluidified by 12% by weight, with respect to the bitumen, of the solvent used to constitute the mother solution (Product IIb1 and Product IIb2 respectively), and of a bitumen-polymer composition prepared in a way similar to that described in Example 2 but without polysulphide (Product IIc1 and

TABLE I

| | Characteristics | | | | | | | | |
|---|---|---|---|---|---|---|---|---|---|
| | penetration | softening | Fraass | Traction tests | | | | | |
| | at 25° C. | point | point | Temp. | speed | σs | σr | εs | εr |
| Product | (1/10 mm) | B & R (°C.) | (°C.) | (°C.) | mm/mn | bars | bars | % | % |
| I a 1 | 68 | 56 | −19.5 | 20 | 500 | 1.4 | 0.6 | 25 | >900 |
| | | | | −10 | 10 | 29 | 10.5 | 15 | 350 |
| I a 2 | 49 | 59 | −17 | 20 | 500 | 1.7 | 0.9 | 15 | >900 |
| | | | | −10 | 10 | 32 | 13 | 15 | 300 |
| I b 1 | 82 | 48 | −18.5 | 20 | 500 | 1.2 | 0 | 15 | >900 |
| | | | | −10 | 10 | | FRAGILE | | |
| I b 2 | 51 | 50 | −15 | 20 | 500 | 1.8 | 0 | 15 | >900 |
| | | | | −10 | 10 | | FRAGILE | | |

TABLE II

| | | | | viscosity | | | | Characteristics | | | |
| | | | | | | | | traction tests | | | |
| Product | penetration at 25° C. (1/10 mm) | softening point B & R (°C.) | Fraass point (°C.) | (Rheomat) at 160° C. (Poise) | Pseudo viscosity (s) | Temp. (°C.) | speed mm/mn | σs bars | σr bars | εs % | εs % |
|---|---|---|---|---|---|---|---|---|---|---|---|
| II.a.1 | | | | 1.18 | 148 | −10 | 500 | 7.2 | 2.4 | 18 | >900 |
| II.a.2 | 82 | 52 | −19 | 3.5 | | 20 | 500 | 0.75 | 0.5 | 20 | >900 |
| | | | | | | −10 | 10 | 18 | 7 | 20 | 450 |
| II.b.1 | | | | 0.7 | 60 | −10 | 500 | FRAGILE | | | |
| II.b.2 | 105 | 47 | −13 | 2.6 | | 20 | 500 | 0.5 | 0 | 15 | 800 |
| | | | | | | −10 | 10 | FRAGILE | | | |
| II.c.1 | | | | 0.81 | 84 | −10 | 500 | 6.3 | 0 | 15 | 300 |
| II.c.2 | 102 | 48 | −15 | 2.5 | | 20 | 500 | 0.6 | 0 | 15 | 900 |
| | | | | | | −10 | 10 | FRAGILE | | | |

Product IIc2).

In the designation of the product, indice 1 define the compositions before thermal treatment whereas indice 2 define the compositions after thermal treatment.

As can be seen from the comparison of the results shown in Table II, the use of ditertiododecyl pentasulphide, as the sulphur source, in the mother solution technique leads to the obtention of a fluidified bitumen-polymer composition having elastomeric characteristics. After aging, the product gives a residual binder, the properties of which are similar to those of the bitumen-polymer composition obtained in Example 1 by incorporating the polymer and the polysulphide to the bitumen without using the mother solution.

EXAMPLES 3 TO 8

Preparation of bitumen-polymer compositions according to the invention through the mother solution technique.

Operating occurs as described in Example 2 with, however, certain variations that are defined hereinbelow, the other operating conditions being those of Example 2.

In Example 3, the mother solution was formed from 243 parts by weight of the petroleum cut, 53.5 parts of the diblock styrene and butadiene copolymer, and 3.5 parts by weight polysulphide.

In Example 4, the copolymer consisted of a diblock styrene and isoprene copolymer containing 22% by weight styrene and having an average vicosimetric molecular weight of about 78.000.

In Example 5, the copolymer consisted of a diblock styrene and carboxylated butadiene copolymer containing 25% by weight styrene and presenting an average viscosimetric mass of about 76.000.

In Example 6, the polysulphide consisted of dinonyl pentasulphide having a molecular weight equal to 414.

In Example 7, the polysulphide was the same as that used in Example 6 and the mother solution was formed from 240 parts by weight of the petroleum cut, 54 parts by weight of the copolymer, and 6 parts by weight of polysulphide.

In Example 8, the polysulphide was the same as that used in Example 6, and the mother solution was formed from 243 parts by weight of the petroleum cut, 54 parts by weight of the copolymer, and 3 parts by weight of polysulphide.

Table III gives the characteristics of the bitumen-polymer compositions thus obtained, before and after having subjected them to the thermal treatment defined in Example 2.

The bitumen-polymer compositions before thermal treatment are designated by "Product Ya2", Y representing the number of the Example in Roman numerals.

TABLE III

| | | | | | viscosity | | | | Traction tests | | | |
| Example | Product | penetration at 25° C. (1/10 mm) | softening point B & R (°C.) | Fraass point (°C.) | (Rheomat) at 160° C. (Poise) | Pseudo viscosity (s) | Temp. (°C.) | speed mm/mn | σs bars | σs bars | εs % | εs % |
|---|---|---|---|---|---|---|---|---|---|---|---|---|
| 3 | III.a.1 | | | | 0.94 | 120 | −10 | 500 | 7.3 | 0.33 | 15 | 450 |
| | III.a.2 | 90 | 50 | −20 | 3.1 | | 20 | 500 | 0.6 | 0.4 | 20 | >900 |
| | | | | | | | −10 | 10 | 15 | 5 | 20 | 400 |
| 4 | IV.a.1 | | | | 1.35 | 160 | −10 | 500 | 8.1 | 2.8 | 15 | >900 |
| | IV.a.2 | 78 | 54 | −19 | 4 | | 20 | 500 | 0.9 | 0.6 | 15 | 700 |
| | | | | | | | −10 | 10 | 22 | 8 | 15 | 200 |
| 5 | V.a.1 | | | | 1.25 | 175 | −10 | 500 | 7.6 | 3.5 | 20 | >900 |
| | V.a.2 | 75 | 55 | −21 | 4.1 | | 20 | 500 | 1 | 0.7 | 20 | 900 |
| | | | | | | | −10 | 10 | 25 | 9.5 | 15 | 660 |
| 6 | VI.a.1 | | | | 1.25 | 138 | −10 | 500 | 5.9 | 2.45 | 18 | >900 |
| | VI.a.2 | 80 | 55 | −21 | 4.6 | | 20 | 500 | 1.2 | 1 | 20 | >900 |
| | | | | | | | −10 | 10 | 24 | 10.5 | 20 | 500 |
| 7 | VII.a.1 | | | | 1.05 | 115 | −10 | 500 | 6.6 | 1.2 | 18 | >900 |
| | VII.a.2 | 87 | 55 | −18 | 3.8 | | 20 | 500 | 1 | 0.3 | 25 | >900 |
| | | | | | | | −10 | 10 | 20 | 6.3 | 15 | 270 |
| 8 | VIII.a.1 | | | | 0.98 | 104 | −10 | 500 | 7.4 | 0.5 | 18 | 560 |
| | VIII.a.2 | 105 | 49 | −20 | 2.5 | | 20 | 500 | 0.9 | 0.15 | 25 | 900 |
| | | | | | | | −10 | 10 | 17 | 4.2 | 25 | 100 |

We claim:

1. A polymer mother solution for the preparation of bitumen-polymer compositions, comprising a hydrocarbon oil having a distillation range, at atmospheric pressure comprised between 100° C. and 450° C., and in solution in the oil, from about 5 to 40% by weight of the oil of a styrene conjugated diene copolymer and from about 0.1 to 15% by weight of the oil of a sulphur source, wherein the sulphur source comprises a polysulphide of the formula:

$$R_1-(S)_m-R-(S)_m)_x R_2$$

wherein:
R$_1$ and R$_2$ are each independently a C$_1$ to C$_{20}$ saturated monovalent hydrocarbon radical, a C$_1$ to C$_{20}$ unsaturated monovalent hydrocarbon radical or R$_1$ to R$_2$ can be linked to form a C$_1$ to C$_{20}$ saturated divalent hydrocarbon radical or a C$_1$ to C$_{20}$ unsaturated divalent hydrocarbon radical;

R is a C$_1$ to C$_{20}$ saturated divalent hydrocarbon radical or a C$_1$ to C$_{20}$ unsaturated divalent hydrocarbon radical;

—(S)$_m$ is a divalent group of sulphur atoms, wherein m can be different for each group and represents a whole number of from 1 to 6 with at least m in one group being at least 2; and x represents a whole number ranging from 0 to 10.

2. A mother solution according to claim 1, wherein the polysulphide is defined by the formula $$R_1-(S)_n-R_2$$

wherein
R$_1$ and R$_2$ each represent a C$_1$ to C$_{20}$ saturated monovalent hydrocarbon radical or a C$_1$ to C$_{20}$ unsaturated hydrocarbon radical or R$_1$ and R$_2$ can be linked together to form a C$_1$ to C$_{20}$ saturated divalent hydrocarbon radical or an unsaturated divalent hydrocarbon radical;

—(S)$_n$— represents a divalent group of n sulphur atoms; n being an integer of from 2 to 6.

3. A mother solution according to claim 1 or 2, wherein R$_1$ and R$_2$ are identical and selected from C$_1$ to C$_{20}$ alkyl radicals, C$_6$ to C$_{20}$ aryl radicals and C$_6$ to C$_{20}$ cycloalkyl radicals or are linked together to form a C$_1$ to C$_{20}$ divalent alkylene radical, a C$_6$ to C$_{20}$ cycloalkylene or a C$_6$ to C$_{20}$ arylene radical, and wherein R is selected from C$_1$ to C$_{20}$ alkylene radicals, C$_6$ to C$_{20}$ cycloalkylene radicals and C$_6$ to C$_{20}$ arylene radicals.

4. A mother solution according to claim 2, wherein the polysulphide has the formula:

$$R_3-(S)_p-R_3$$

wherein:
R$_3$ is a C$_6$ to C$_{16}$ alkyl radical; and
—(S)$_p$— represents a divalent group of p sulphur atoms,
p being an integer of from 2 to 5.

5. A mother solution according to claim 1 or 2, prepared by contacting the hydrocarbon oil, copolymer and polysulphide with stirring, at a temperature between 40° and 120° C.

6. A road surface covering comprising a bitumen-polymer composition prepared by
(a) forming a mixture of a bitumen, from about 0.5 to 15% by weight of the bitumen of a styrene-conjugated diene copolymer and from about 0.005 to 15% by weight of the bitumen of a polysulfide of the formula:

$$R_1-(S)_m(R-(S)_m)_x R_2$$

wherein R$_1$ and R$_2$ are each independently a C$_1$ to C$_{20}$ saturated monovalent hydrocarbon radical or a C$_1$ to C$_{20}$ unsaturated monovalent hydrocarbon radical, or R$_1$ or R$_2$ can be linked to form a C$_1$ to C$_{20}$ saturated divalent hydrocarbon radical or a C$_1$ to C$_{20}$ unsaturated divalent hydrocarbon radical, R is a C$_1$ to C$_{20}$ saturated divalent hydrocarbon radical or a C$_1$ to C$_{20}$ unsaturated divalent hydrocarbon radical; (S)$_m$ is a divalent group of m sulfur atoms wherein m can be different for each group and represents a whole number of from 1 to about 6 with at least m in one group being at least 2; and x is a whole number ranging from 0 to 10.

7. A mother solution according to claim 1 or 2, wherein the copolymer has an average viscosimetric molecular weight comprised between 70,000 and 200,000.

8. A road surface covering according to claim 6 wherein the copolymer is selected from random and block copolymers of styrene with a conjugated diene, selected from butadiene, isoprene chloroprene, carboxylated butadiene, and carboxylated isoprene.

9. A road surface covering according to claim 6 wherein the copolymer has a weight content of styrene ranging from 15% to 40%.

10. A road surface covering according to claim 6 wherein the copolymer has an average viscosimetric molecular weight comprised between 30,000 and 300,000.

11. A road surface covering according to claim 6 wherein the copolymer has an average viscosimetric molecular weight comprised between about 70,000 and 200,000.

12. A road surface covering according to claim 6 wherein the polysulfide is defined by the formula $$R_1-(S)_n-R_2$$

wherein
R$_1$ and R$_2$ each represent a C$_1$ to C$_{20}$ saturated monovalent hydrocarbon radical or a C$_1$ to C$_{20}$ unsaturated hydrocarbon radical, or R$_1$ and R$_2$ can be linked together to form a C$_1$ to C$_{20}$ saturated divalent hydrocarbon radical or an unsaturated divalent hydrocarbon radical;

—(S)$_n$— represents a divalent group of n sulphur atoms; n being an integer of from 2 to 6.

13. A road surface covering according to claim 6 wherein
R$_1$ and R$_2$ are identical and selected from C$_1$ to C$_{20}$ alkyl radicals, C$_6$ to C$_{20}$ aryl radicals and C$_6$ to C$_{20}$ cycloalkyl radicals or are linked together to form a C$_1$ to C$_{20}$ divalent alkylene radical, a C$_6$ to C$_{20}$ cycloalkylene or a C$_6$ to C$_{20}$ arylene radical, and wherein R is selected from C$_1$ to C$_{20}$ alkylene radicals, C$_6$ to C$_{20}$ cycloalkylene radicals and C$_6$ to C$_{20}$ arylene radicals.

14. A road surface covering according to claim 6 wherein the polysulphide has the formula:

$$R_3-(S)_p-R_3$$

wherein:
R$_3$ is a C$_6$ to C$_{16}$ alkyl radical; and,
—(S)$_p$— represents a divalent group of p sulphur atoms,
being an integer of from 2 to 5.

15. A road surface covering according to claim 6, wherein the copolymer and the polysulphide are added to the bitumen as a mother solution comprising a hydrocarbon oil having a distillation range, at atmospheric pressure comprised between 100° C. and 450° C., and in solution in the copolymer and from about 0.1 to 15% by weight of the oil of the polysulphide.

16. A mother solution according to claim 1 or 2, wherein the copolymer is selected from random and block copolymers of styrene with a conjugated diene, selected from butadiene, isoprene chloroprene, carboxylated butadiene, and carboxylated isoprene.

17. A mother solution according to claim 1 or 2, wherein the copolymer has a weight content of styrene ranging from 15% to 40%.

18. A mother solution according to claim 1 or 2, wherein the copolymer has an average viscosimetric molecular weight comprised between 30,000 and 300,000.

19. A mother solution according to claim 1 or 2, wherein the hydrocarbon oil has a distillation range, at atmospheric pressure, between 150° C. and 370° C.

20. A mother solution according to claim 1 or 2, wherein the hydrocarbon oil is selected from petroleum cuts having an aromatic character, the petroleum cuts having a naphteno-paraffin character, petroleum cuts having a naphteno-aromatic character, coal oils, and oils of vegetable origin.

21. A mother solution according to claim 1 or 2, containing from 10 to 35% copolymer and 0.5 to 5% polysulphide expressed by weight of the hydrocarbon oil.

22. A mother solution according to claim 1 or 2, prepared by contacting the hydrocarbon oil, copolymer and polysulphide with stirring, at a temperature between 20° and 170° C.

* * * * *

UNITED STATES PATENT AND TRADEMARK OFFICE
CERTIFICATE OF CORRECTION

PATENT NO. : 4,567,222  
DATED : January 28, 1986  
INVENTOR(S) : Germain Hagenbach et al.

Page 1 of 2

It is certified that error appears in the above-identified patent and that said Letters Patent is hereby corrected as shown below:

Column 3, line 17: change "$R_1-(S)_{\overline{m}}\!-\!\!-\!\!R-(S)_m)_x R_2$" to read $$--R_1-(S)_{\overline{m}}\!\!-\!\!(R-(S)_{\overline{m}})_{\overline{x}}\,R_2--$$

Column 11, line 5: change "$R_1-(S)_{\overline{m}}\!-\!\!-\!\!R-(S)_m)_x R_2$" to read $$--R_1-(S)_{\overline{m}}\!\!-\!\!(R-(S)_{\overline{m}})_{\overline{x}}\,R_2--$$

Column 6, line 45: change "standred" to --standard--

Column 6, line 48: change "$\alpha_s$" to --$\sigma_s$--

Column 6, line 50: change "$\alpha_r$" to --$\sigma_r$--

Column 7, line 67: change "thus" to --this--

Column 10, line 38: "Product Ya2" should read --Product Ya.1 and after treatment by Ya2--

UNITED STATES PATENT AND TRADEMARK OFFICE
CERTIFICATE OF CORRECTION

PATENT NO. : 4,567,222

DATED : January 28, 1986

INVENTOR(S) : Germain Hagenbach et al.

It is certified that error appears in the above-identified patent and that said Letters Patent is hereby corrected as shown below:

Claim 15 should read as follows:

--Claim 15. A road surface covering according to claim 6, wherein the copolymer and the polysulphide are added to the bitumen as a mother solution comprising a hydrocarbon oil having a distillation range, at atmospheric pressure comprised between 100°C. and 450°C., and in solution in the oil from about 5 to 40% by weight of the oil of the copolymer and from about 0.1 to 15% by weight of the oil of the polysulphide.--

Signed and Sealed this

Twenty-ninth Day of July 1986

[SEAL]

Attest:

DONALD J. QUIGG

Attesting Officer

Commissioner of Patents and Trademarks